(12) United States Patent
Ng et al.

(10) Patent No.: US 8,544,840 B2
(45) Date of Patent: Oct. 1, 2013

(54) AUTOMATIC DOCUMENT FEEDER

(75) Inventors: Keng Leong Ng, Singapore (SG);
Thaddie Natalaray, Singapore (SG);
Kyi Thu Maung, Singapore (SG); Toh Tung Wong, Singapore (SG); Wayne E Foote, Eagle, ID (US); Jeffrey C Madsen, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1572 days.

(21) Appl. No.: 11/742,563

(22) Filed: Apr. 30, 2007

(65) Prior Publication Data
US 2008/0265489 A1  Oct. 30, 2008

(51) Int. Cl.
*B65H 29/00* (2006.01)
*B65H 15/00* (2006.01)

(52) U.S. Cl.
CPC ..................... *B65H 15/00* (2013.01)
USPC .......................... 271/186; 399/374

(58) Field of Classification Search
USPC ................. 271/185, 186, 163; 399/374
See application file for complete search history.

(56) References Cited

U.S. PATENT DOCUMENTS

| | | |
|---|---|---|
| 5,154,412 A | 10/1992 | Iseda |
| 5,430,536 A | 7/1995 | Fullerton et al. |
| 5,887,865 A | 3/1999 | Ishimaru |
| 6,206,359 B1 | 3/2001 | Hirota et al. |
| 6,209,861 B1 | 4/2001 | Kakuta et al. |
| 6,241,237 B1 | 6/2001 | Bokelman |
| 6,307,614 B1 | 10/2001 | Gaarder et al. |
| 6,547,235 B2 | 4/2003 | Higaki |
| 7,021,619 B2 | 4/2006 | Watanabe et al. |
| 2001/0014234 A1* | 8/2001 | Kono ............................. 399/374 |
| 2004/0140606 A1* | 7/2004 | Kobayashi et al. ............ 271/186 |
| 2004/0253030 A1* | 12/2004 | Hamada et al. ................ 399/367 |

FOREIGN PATENT DOCUMENTS

JP  2006232460 A  *  9/2006

* cited by examiner

*Primary Examiner* — Gerald McClain

(57) ABSTRACT

An automatic document feeder with a drive system that can efficiently handle double-side scanning and accommodate more than one timing sequence for sequentially picking individual sheets from a stack using only two motors—a pick motor and a media motor. The automatic document feeder includes a pickup unit with a pick roller, a set of de-skew rollers, a main media path configured to guide a media sheet from the pickup unit to a scanning region and from the scanning region to an output tray, and a switch-back path configured to guide the media sheet back into the main media path. The drive system is operable to provide a high-speed picking mode and a delayed picking mode. In the high-speed picking mode, the pickup unit is driven by the pick motor to pull a subsequent media sheet from a stack of media sheet as soon as a previously pulled media sheet has passed the pick roller. In the delayed picking mode, the de-skew rollers are driven by the pick motor to advance the media sheet toward the scanning region and the subsequent media sheet is pulled from the stack by the pickup unit when the previously pulled media sheet has passed the de-skewed rollers.

20 Claims, 19 Drawing Sheets

AUTOMATIC DOCUMENT FEEDER

FIELD OF THE INVENTION

The present invention generally relates to a sheet feeding apparatus for feeding media sheets to an imaging device.

BACKGROUND

Nowadays, many imaging devices such as multifunction printers, copying machines and scanners are provided with an automatic document feeder (ADF) for automatically transporting individual sheets from a stack of media sheets to an image reading position, and then ejecting and restacking the sheets automatically. Typically, an optical image reader is arranged at the image reading position to read (i.e. scan) the image on one side of the media sheet. Conventional automatic document feeders also have a double-sided ("duplex") mode wherein images on both sides of a sheet are scanned by the image reader. In the double-sided mode, after the image on one side of a sheet is scanned by the image reader, the sheet is partially discharged, and then the same sheet is re-routed back through the ADF so that the image on the opposite side of the sheet can be scanned.

Maximizing the throughput performance of an ADF requires the ability to begin picking up a subsequent media sheet from a stack of media sheets while the previously picked media sheet is at the image reading position. In some situations, image quality is more important than high throughput, and it is more desirable to wait until a sheet has been completely scanned by the image reader before picking up a subsequent sheet. The challenge is to provide an ADF that can accommodate more than one timing sequence for picking so as to give the user a choice between high throughput and high image quality. Conventional low-cost automatic document feeders are not capable of providing both double-side scanning and flexible timing sequence for picking.

SUMMARY

The present invention is directed to an automatic document feeder with a drive system that can efficiently handle double-side scanning and accommodate more than one timing sequence for sequentially picking individual sheets from a stack using only two motors. The automatic document feeder includes a pickup unit having a pick roller, a set of de-skew rollers, a main media path configured to guide a media sheet from the pickup unit to a scanning region and from the scanning region to an output tray, and a switch-back path configured to guide the media sheet back into the main media path. The drive system is operable to provide a high-speed picking mode and a delayed picking mode. In the high-speed picking mode, the pickup unit is driven by a pick motor to pull a subsequent media sheet from a stack of media sheet as soon as a previously pulled media sheet has passed the pick roller. In the delayed picking mode, the de-skew rollers are driven by the pick motor to advance the media sheet toward the scanning region and the subsequent media sheet is pulled from the stack by the pickup unit when the previously pulled media sheet has passed the de-skewed rollers.

The objects and advantages of the present invention will become apparent from the detailed description when read in conjunction with the drawings.

BRIEF DESCRIPTION OF THE DRAWINGS

FIG. 10 4 shows the components in the drive system that are involved in driving the pickup unit to perform picking.

DETAILED DESCRIPTION

Figure 1:
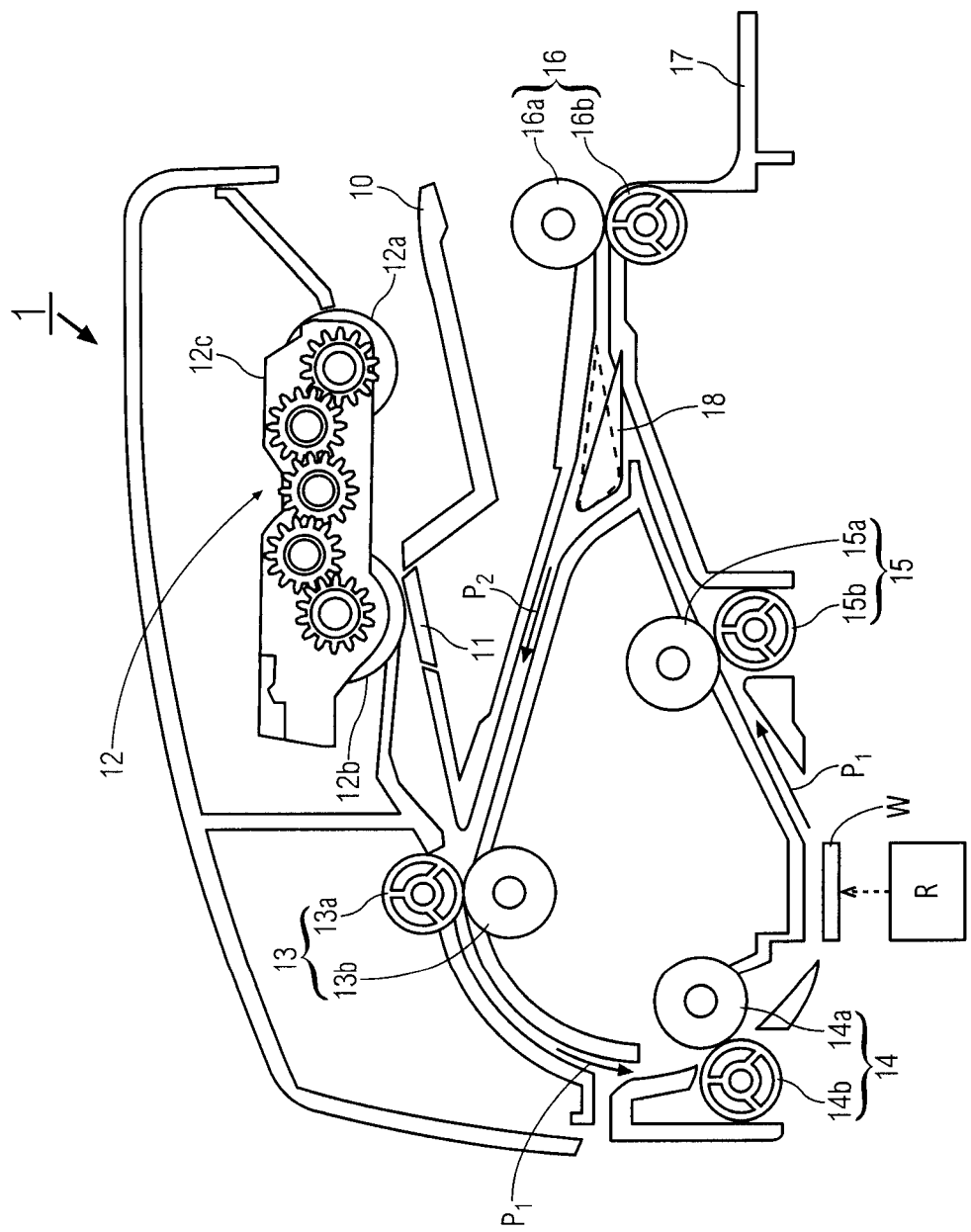
FIG. 1 is a schematic sectional view showing an automatic document feeder according to an embodiment of the present invention.

FIG. 1 shows an automatic document feeder 1 (herein after referred to as "ADF 1") equipped with an image reader R according to one embodiment. The ADF 1 includes a sheet supply tray 10 for holding a stack of media sheets (hereinafter, simply referred to as "media stack"), a pickup unit 12, a set of de-skew rollers 13, a set of pre-scan rollers 14, a set of post-scan rollers 15, a set of output rollers 16, and an output tray 17. The ADF 1 includes a substantially U-shaped, main media path $P_1$ for guiding the media sheet from the pickup unit 12 to the output tray 17. An optical window is arranged along the media path $P_1$ between the pre-scan rollers 14 and the post scan rollers 15. The image data on one side of the media sheet can be read through the optical window W by a conventional image reader R, e.g. an optical scanner, which is arranged on one side the optical window W. As such, the region above the optical window W defines a scanning region of the ADF 1. The pickup unit 12 includes a pick roller 12a and a feed roller 12b, which are supported in a housing 12c. The pickup unit 12 is configured to pull (i.e., "pick") the uppermost sheet from the media stack and transporting the uppermost sheet toward the de-skew rollers 13. A separation pad 11 is provided under the feed roller 12b in order to allow only the uppermost sheet to pass. Although it is not apparent from the cross-sectional view shown in FIG. 1, the de-skew rollers 13 include a plurality of upper pinch rollers 13a cooperating with a plurality of lower de-skew rollers 13b to form a pinch there between. The de-skew rollers 13 are operable to perform skew correction of the separated sheet and to advance the same sheet along the media path $P_1$ toward the pre-scan rollers 14. The pre-scan rollers 14 are designed to advance the media sheet further downstream toward the scanning region where the optical window W is located. The post-scan rollers 15 are configured to advance the media sheet from the image reading position toward the output rollers 16. The pre-scan rollers include a plurality of upper pre-scan rollers 14a cooperating with a plurality of lower idler rollers 14b. Similarly, the post-scan rollers 15 include a plurality of upper post-scan rollers 15a cooperating with a plurality of lower idler rollers 15b. The output rollers 16 are configured to discharge the media sheet after scanning to the output tray 17. The output rollers 16 include a pair of upper output rollers 16a cooperating with a pair of lower output rollers 16b. The ADF 1 also includes a switch-back path $P_2$ that extends from the output rollers 16 to the de-skew rollers 13. A switching lever 18 is positioned at a junction between the main media path $P_1$ and the switch-back path $P_2$ to guide the direction of the sheet. The switching lever 18 is normally at a "down" position that blocks the sheet passage from the post-scan rollers 15 to the output tray 17, unless the leading edge of a sheet being discharged pushes it upward to allow the sheet to pass. When the switching lever 18 is at the "down" position, the sheet can be guided into the switch-back path $P_2$.

Figure 2:
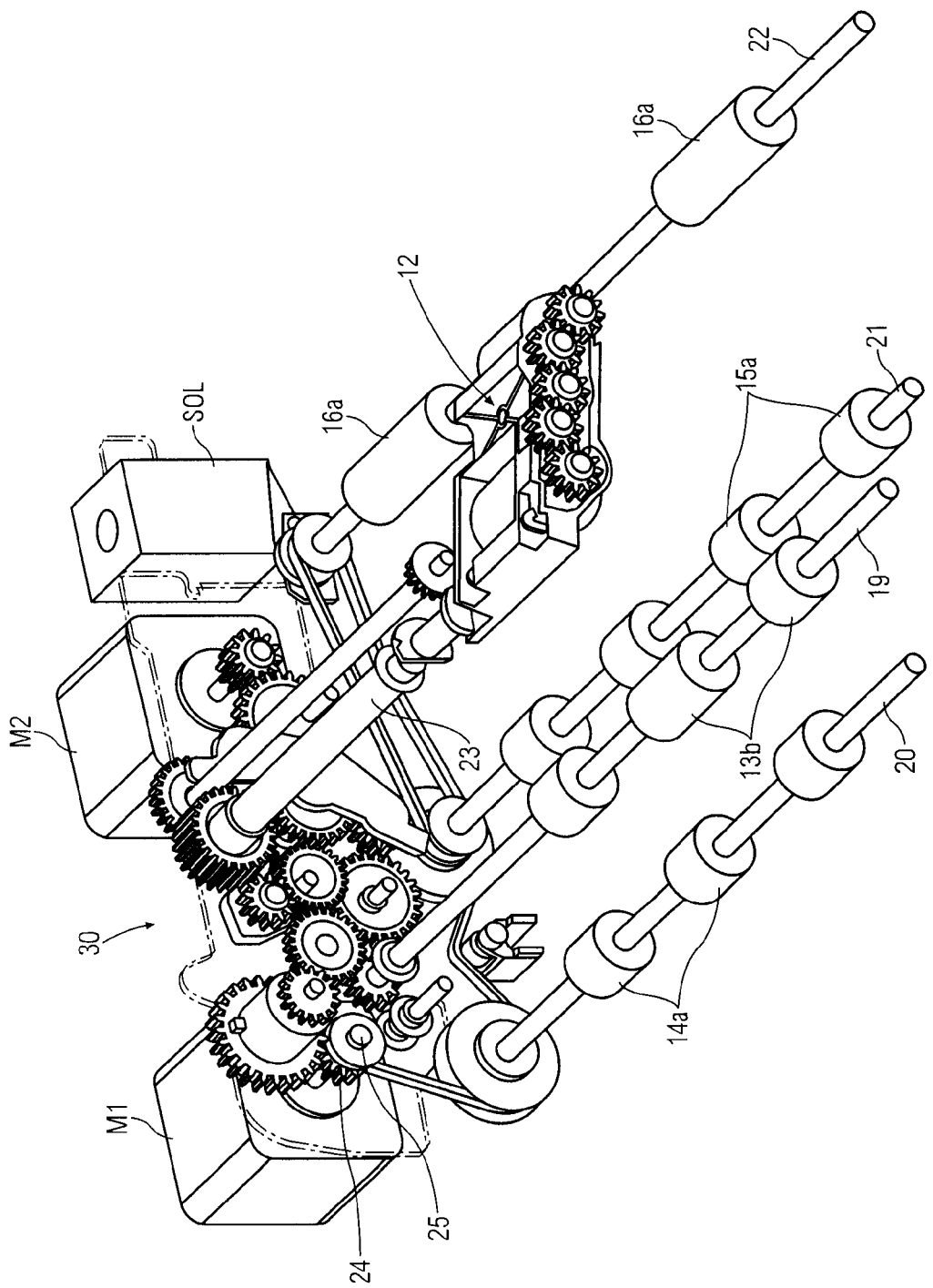
FIG. 2 is an isometric view showing an embodiment of a drive system for the automatic document feeder of FIG. 1.

Referring to FIG. 2, the lower de-skew rollers 13b comprise a series of spaced rollers fixedly mounted on a de-skew shaft 19. The upper pre-scan rollers 14a and the upper post-scan rollers 15a also comprise a series of spaced rollers fixedly mounted on respective common shafts 20 and 21. The upper output rollers 16a are fixedly mounted on a common shaft 22. The pickup unit 12 is coupled to a cam shaft 23 so as to be pivotable relative to the cam shaft 23. Also shown in FIG. 2 is an embodiment of the drive system for the ADF 1. This drive system includes a media motor M1, a pick motor M2, a solenoid SOL, and a drive transmission 30 associated with the media motor M1 and the pick motor M2. The drive transmission 30 will be subsequently described in greater detail. The media motor M1 is the power source for pivoting the pickup unit 12 downward or upward, and is also the power source for driving pre-scan rollers 14a, post-scan rollers 15a and upper output rollers 16a. The media motor M1 has a motor gear 24, which is mounted on the drive axis 25 of the media motor M1. The pick motor M2 is the power source for driving the pickup unit 12 so as to perform picking of the uppermost sheet from the media stack. The pick motor M2 is also the power source for driving the lower de-skew rollers 13b in order to advance the media sheet toward the pre-scan rollers 14. The solenoid SOL is operatively connected to the lower output rollers 16b such that the lower output rollers 16b are caused to move toward from the upper output rollers 16a when solenoid SOL is activated at a predetermined timing. As such, the timing for nipping the upper and lower output rollers (16a, 16b) can be controlled by the solenoid SOL.

Figure 3A:
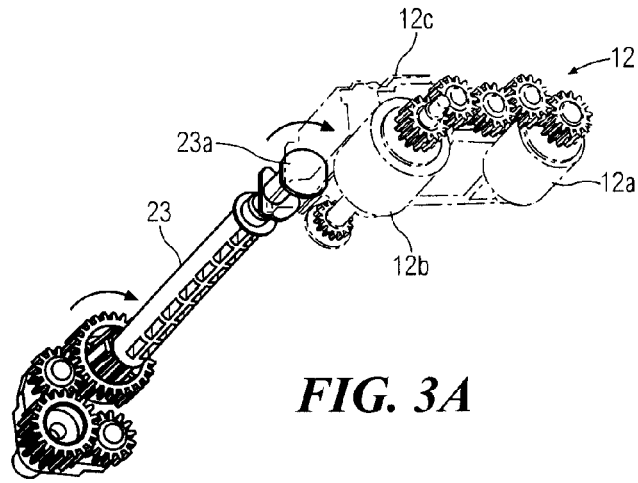
FIGS. 3A and 3B illustrate a pickup unit, which is implemented in the automatic document feeder shown in FIG. 1, being pivoted downward.
Figure 3B:
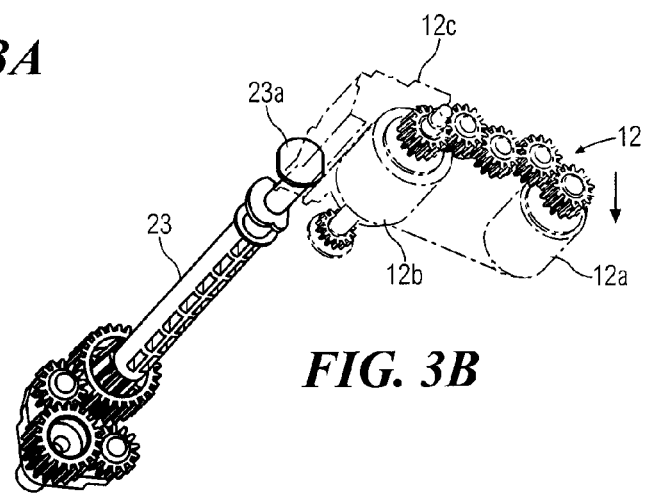

Referring to FIGS. 3A and 3B, the housing 12c of the pickup unit 12 is coupled to one end of the cam shaft 23. The cam shaft 23 has a disc-shaped cam head 23a, which is in contact with the housing 12c. The cam head 23a is shaped such that the rotational movement of the cam shaft in one direction causes the pick-up unit 12 to pivot from a stowed position (FIG. 3A) to a picking position (FIG. 3B), and vice versa. When the pickup unit 12 is in the stowed position (FIG. 3A), the pick roller 12a is out of contact with the uppermost sheet of the media stack placed in the supply tray 11, and when the pickup unit 12 is in the picking position (FIG. 3B), the pick roller 12a is in contact with the uppermost sheet.

Figure 4:
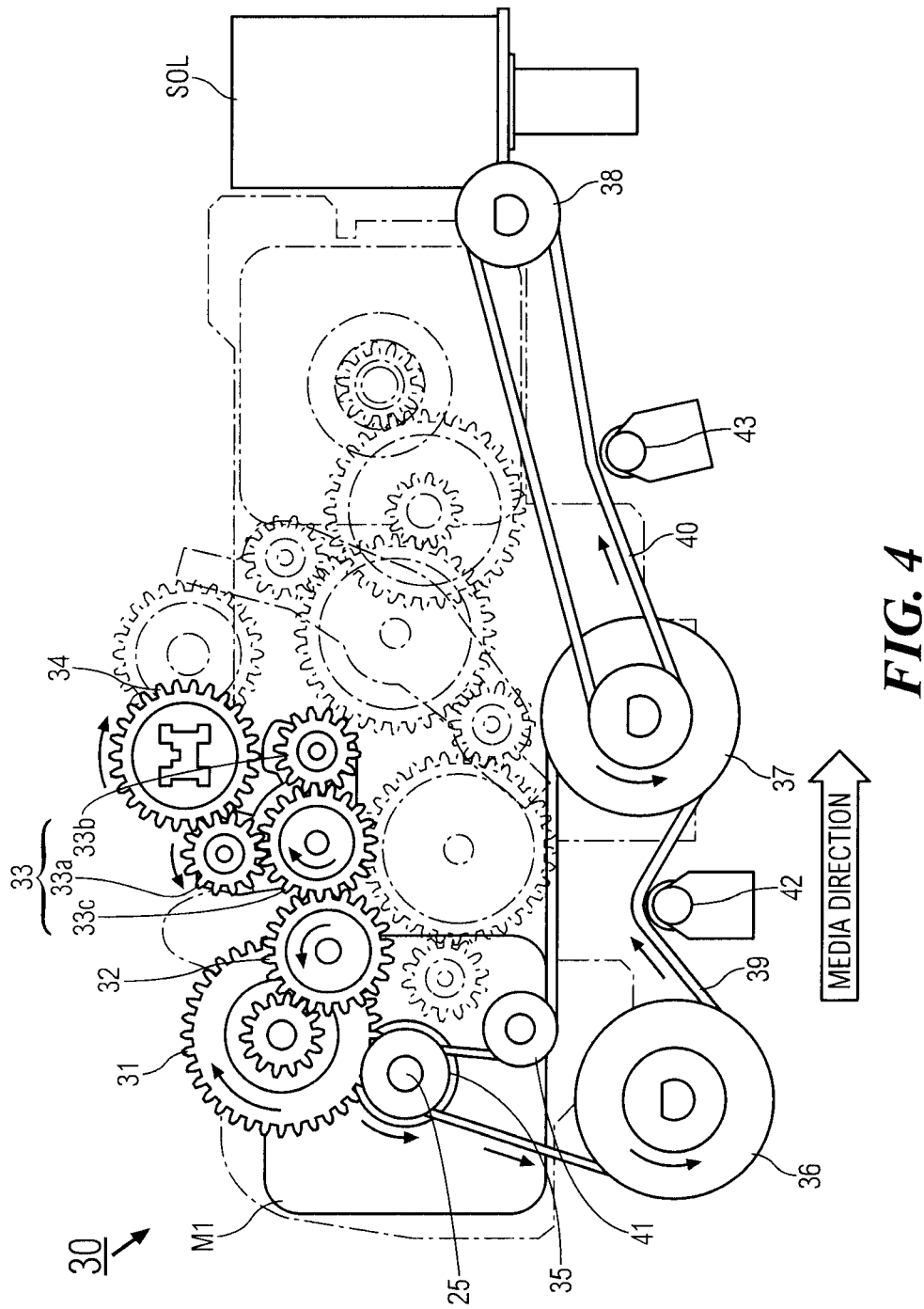
FIG. 4 shows the components in the drive system that are involved in pivoting the pickup unit downward and advancing a media sheet through a media path in the automatic document feeder.

Picking of the uppermost media sheet from the media stack is initiated by pivoting the pickup unit 12 from the stowed position to the picking position, thereby lowering the pick roller 12a. The media motor M1 is the power source for driving the rotation of the cam shaft 23, to thereby cause the pickup unit 12 to pivot. Referring to FIG. 4, the driving force of the media motor M1 is transmitted to the cam shaft 23 via a gear train, which includes a compound gear 31, a drive gear 32, a swing gear set 33 and a cam gear 34. The motor gear 24 of media motor M1 (visible in FIG. 2) meshes with the compound gear 31. The cam gear 34 is coaxially attached to one end of the cam shaft 23 such that the rotation of the cam gear 34 causes the cam shaft 23 to rotate in the same direction. The swing gear set 33 includes an upper swing gear 33a, a lower swing gear 33b, and a middle gear 33c. The swing gear set 33 can be swiveled to selectively engage either the upper swing gear 33a or the lower swing gear 33b with cam gear 34. As shown in FIG. 4, when the media motor M1 rotates in one direction (counter-clockwise), the upper swing gear 33a is caused to mesh with the cam gear 34 (the lower swing gear 33b is out of contact with cam gear 34 at this time), thereby causing the cam gear 34 to rotate in the opposite direction (clockwise). Consequently, the cam shaft 23 is driven to pivot the pickup unit 12 downward (FIGS. 3A and 3B).

Figure 5A:
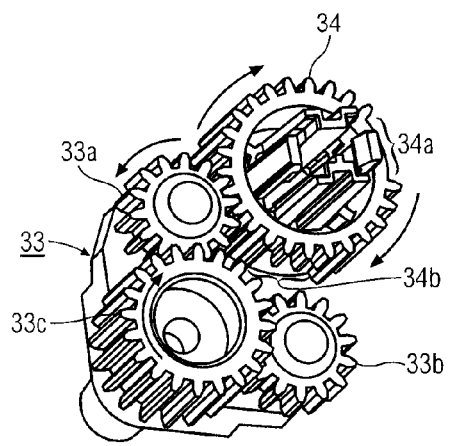
FIGS. 5A and 5B show a cam gear and a swing gear set involved in the procedure of pivoting the pickup unit downward.
Figure 5B:
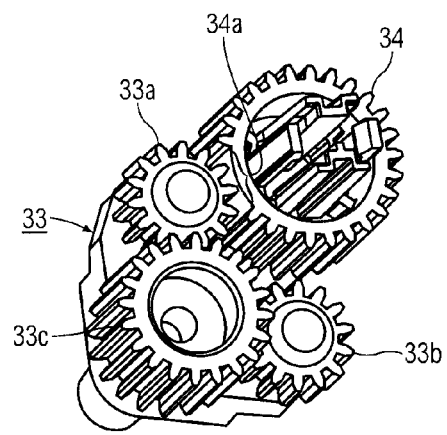

FIGS. 5A and 5B illustrate the mechanics of the swing gear set 33 and the cam gear 34 when the pickup unit 12 is driven to pivot downward. The cam gear 34 is configured to have a first cut-away (toothless) portion 34a and a second cut-away portion 34b in order to limit the rotation of the cam gear. Initially, while the pickup unit is in the stowed position, the upper swing gear 33a engages the cam gear 34, but the cut-away portion 34a is out of contact with the upper swing gear 33a as shown in FIG. 5A. Referring to FIG. 5B, when the cam gear 34 is driven by the upper swing gear 33a to rotate clockwise, the cam gear 34 rotates until the cut-away portion 34a reaches the upper swing gear 33a, resulting in the pickup unit 12 being pivoted downward, at which time, cam gear 34 ceases to rotate and further rotation of the upper swing gear 33a does not affect the cam gear 34. The cam shaft 23 may be biased by a detent spring (not shown) to maintain the cam gear 34 in this position.

Figure 6:
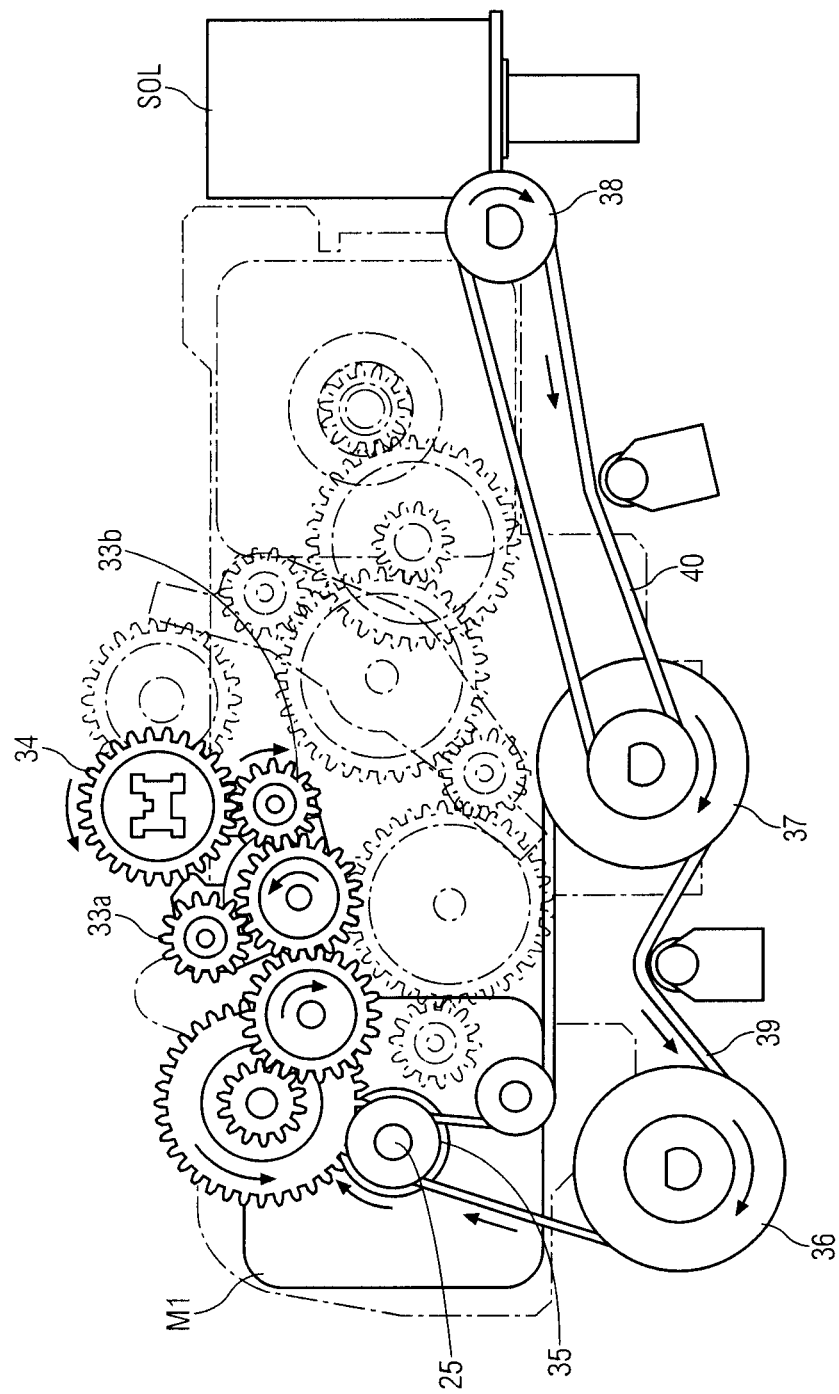
FIG. 6 illustrates how the same components shown in FIG. 4 are being driven to pivot the pickup unit upward and to transport the media sheet in a reverse direction.
Figure 7A:
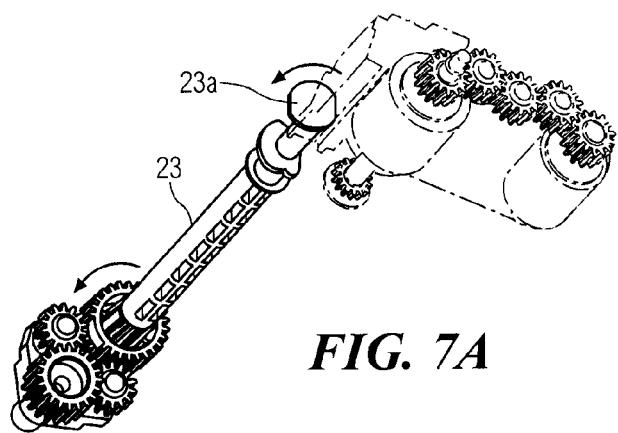
FIGS. 7A and 7B illustrate the pickup unit being pivoted upward.
Figure 7B:
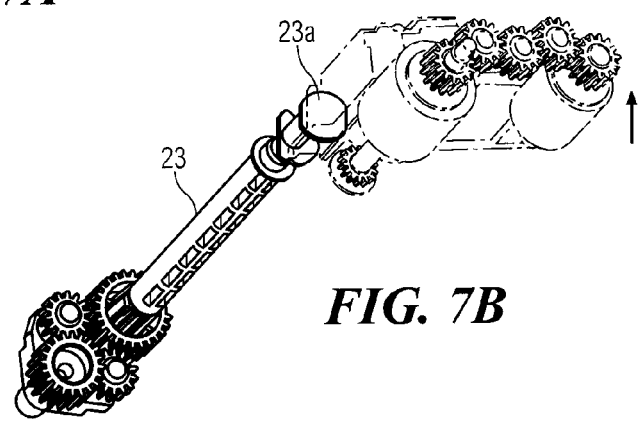

FIG. 6 shows the change in position of the swing gear set 33 when the pick-up unit 12 is driven to pivot upward. As shown in FIG. 6, the media motor M1 rotates clockwise so that the lower swing gear 33b is meshed with the cam gear 34 and the upper swing gear 33a is out of contact with cam gear 34, thereby causing the cam gear 34 to rotate counter-clockwise. Subsequently, the cam shaft 23 is driven to pivot the pickup unit 12 upward (FIGS. 7A and 7B).

Figure 8A:
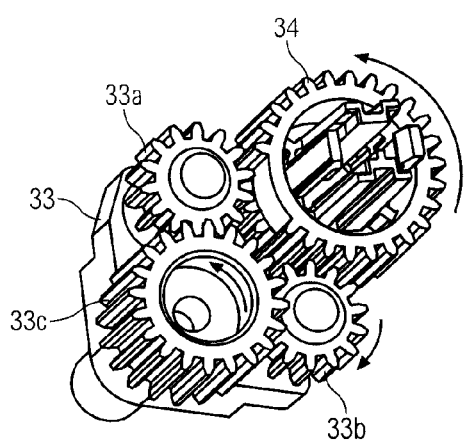
FIGS. 8A and 8B show the same cam gear and swing gear set during the procedure of pivoting the pickup unit upward.
Figure 8B:
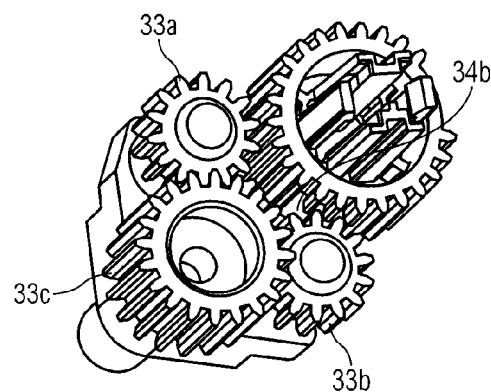

FIGS. 8A and 8B illustrate the mechanics of the swing gear set 33 and the cam gear 34 when the pickup unit 12 is driven to pivot upward. The second cut-away (toothless) portion 34b of cam gear 34 (shown in FIG. 5A) is configured to engage the lower swing gear 33b to limit the counter-clockwise rotation of cam gear 34. Referring to FIG. 7A, while the pickup unit 12 is in the picking position, the lower swing gear 33b engages the cam gear 34, but the cut-away portion 34b is out of contact with the lower swing gear 33b (the cut-away portion 34b is not visible from the angle shown in FIG. 7A). When the cam gear 34 is driven by the lower swing gear 33b to rotate counter-clockwise, cam gear 34 rotates until the cut-away portion 34b reaches the lower swing gear 33b (FIG. 7B), causing the pickup unit 12 to pivot upward, at which time, cam gear 34 ceases to rotate and further rotation of the lower swing gear 33b does not affect the cam gear 34.

Figure 9A:
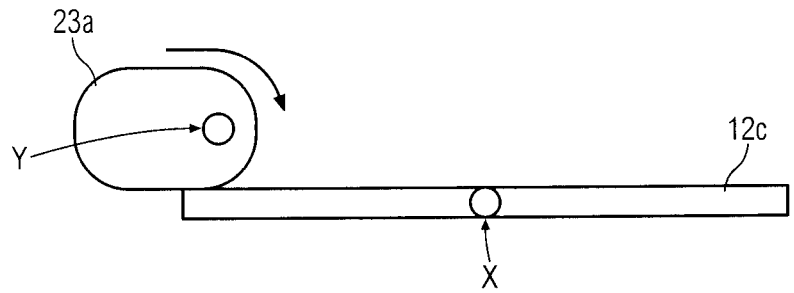
FIGS. 9A-9D are schematic diagrams illustrating how a cam head may be configured to affect the pivoting movement of the pickup unit.
Figure 9B:
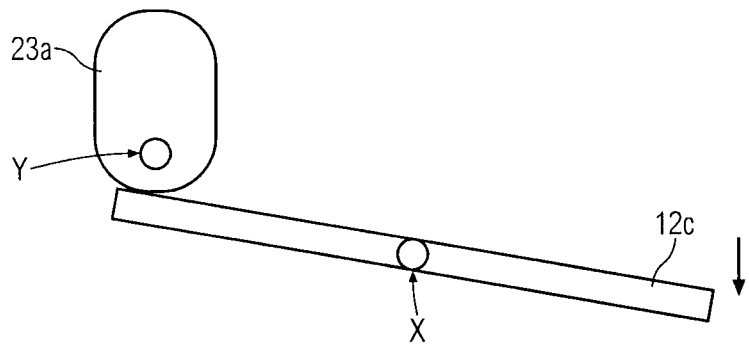
Figure 9C:
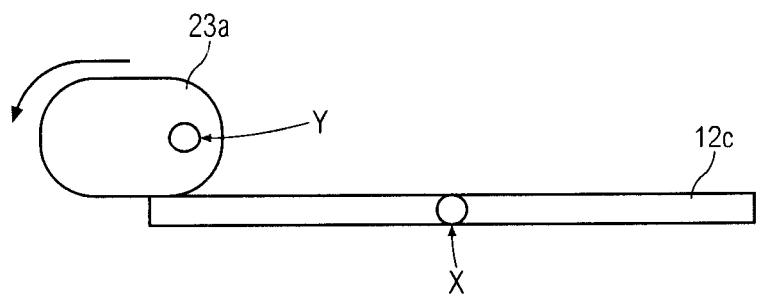
Figure 9D:
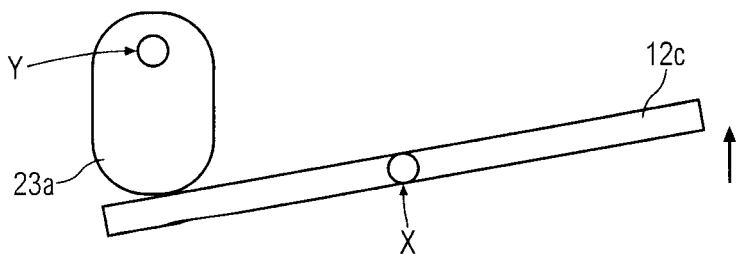

FIGS. 9A-9D illustrate how the cam head 23a may be shaped to affect the pivoting movement of the housing 12c. For purposes of simplicity, only a portion of the housing 12c that engages the cam head 23a is depicted in these figures. The housing 12c is pivotable around an axis of rotation X and the cam head 23a is rotatable around an off-centered axis of rotation Y. From the position shown in FIG. 9A, the cam head 23a rotates clockwise until the housing 12c pivots downward as shown in FIG. 9B. To pivot the housing 12c upward, the cam head 23a rotates counter-clockwise (FIG. 9C) until it is at the position shown in FIG. 9D. As shown in FIGS. 9A-9D, the distance from the axis of rotation Y to the periphery of cam head 23a varies so as to affect the pivoting movement of the housing 12c.

Referring again to FIG. 4, the media motor M1 is also operatively connected to a pulley assembly, which includes pulley 35, pre-scan pulley 36, post-scan pulley 37, exit pulley 38, a first drive belt 39 coupled to pulleys 35-37, and a second drive belt 40 coupled to pulleys 37 and 38. Pulley 35 is disposed on the drive axis 25 of the media motor M1. This pulley assembly also includes tension rollers 41, 42, 43 to provide the necessary tension to the belts 39 and 40. By this arrangement, a driving force from the media motor M1 may be transmitted from pulley 35 to pulleys 36 and 37 via the first belt 39. The same driving force is then transferred from the post-scan pulley 37 to the exit pulley 38 via the second belt 40.

Referring to FIGS. 2, 4, and 6, pre-scan pulley 36 is connected to shaft 20, on which upper pre-scan rollers 14a are mounted, post-scan pulley 37 is connected to shaft 21, on which upper post-scan rollers 15a are mounted, and exit pulley 38 is connected to shaft 22, on which upper output rollers 16a are mounted. As such, when the media motor M1 rotates counter-clockwise (FIG. 4), pre-scan rollers 14a, post-scan rollers 15a, and output rollers 16a are driven to rotate counter-clockwise, thereby causing the media sheet to advance in a forward direction toward the output tray. On the other hand, when the media motor M1 rotates clockwise (FIG. 6), pre-scan rollers 14a, post-scan rollers 15a, and output rollers 16a are driven to rotate clockwise, thereby causing the media sheet to move in a reverse direction.

Figure 10:
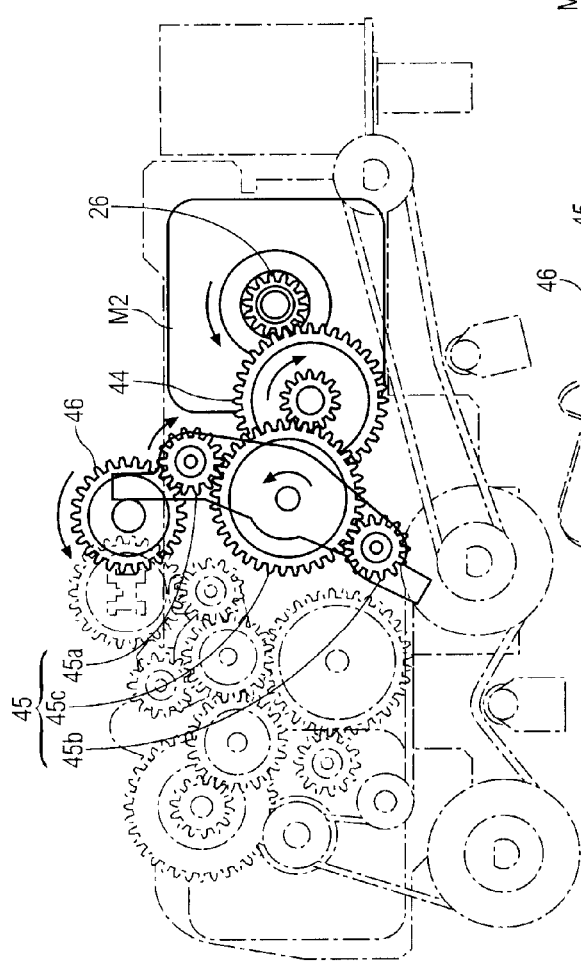

During the picking operation, the pickup unit 12 is driven by the pick motor M2 to pull the uppermost media sheet from the media stack. FIG. 10 shows the gears involved in driving the pickup unit 12 during the picking operation. The pick motor M2 is operatively connected to a gear train, which includes a drive gear 44, a swing gear set 45, and a pick gear 46. The pick motor M2 has a motor gear 26 that meshes with the drive gear 44. The swing gear set 45 includes an upper swing gear 45a, a lower swing gear 45b, and a middle gear 45c. Picking of the media sheet from the media stack is accomplished by rotating the pick motor M2 in the counter-clockwise direction, causing the upper swing gear 45a to mesh with the pick gear 46, thereby causing the pick gear 46 to rotate counter-clockwise.

Figure 11:
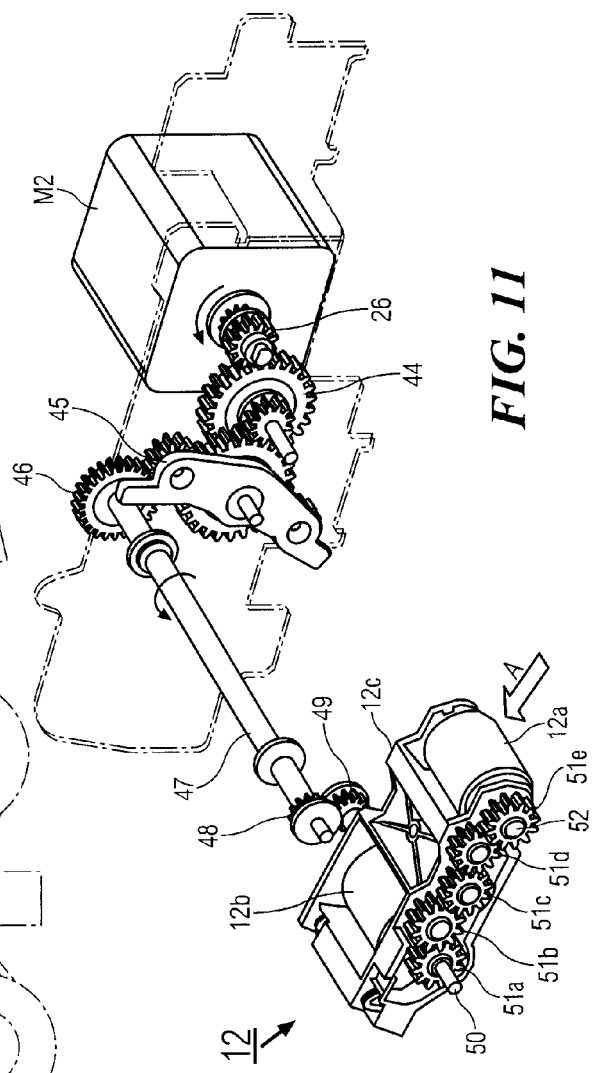
FIG. 11 illustrates how the components shown in FIG. 10 are operatively connected to the pickup unit.

Referring to FIG. 11, the pick gear 46 is attached to one end of a pick shaft 47. The other end of the pick shaft 47 is attached to a shaft gear 48. The pickup unit 12 includes a shaft gear 49, which meshes with shaft gear 48. The shaft gear 49 is fixedly attached to one end of a roller shaft 50, on which feed roller 12b is mounted. The other end of roller shaft 50 is coupled to a gear train composed of gears 51a-51e. The end gear 51e is fixedly attached to a roller shaft 52, on which the pick roller 12a is mounted. The driving force from the pick motor M2 is transmitted to the pick shaft 47 via gears 44, 45 and 46. The driving force from the pick shaft 47 is then transmitted to feed roller 12b via shaft gears 48, 49, causing feed roller 12b to rotate. Consequently, the torque from the feed roller 12b is transferred to pick roller 12a via gears 51a-51e, causing pick roller 12a to rotate. Therefore, when the pick shaft 47 is driven to rotate by the pick motor M2 in the counter-clockwise direction, the pick roller 12a rotates in the clockwise direction, thereby causing the media sheet to be pulled in the direction indicated by arrow A.

Figure 12:
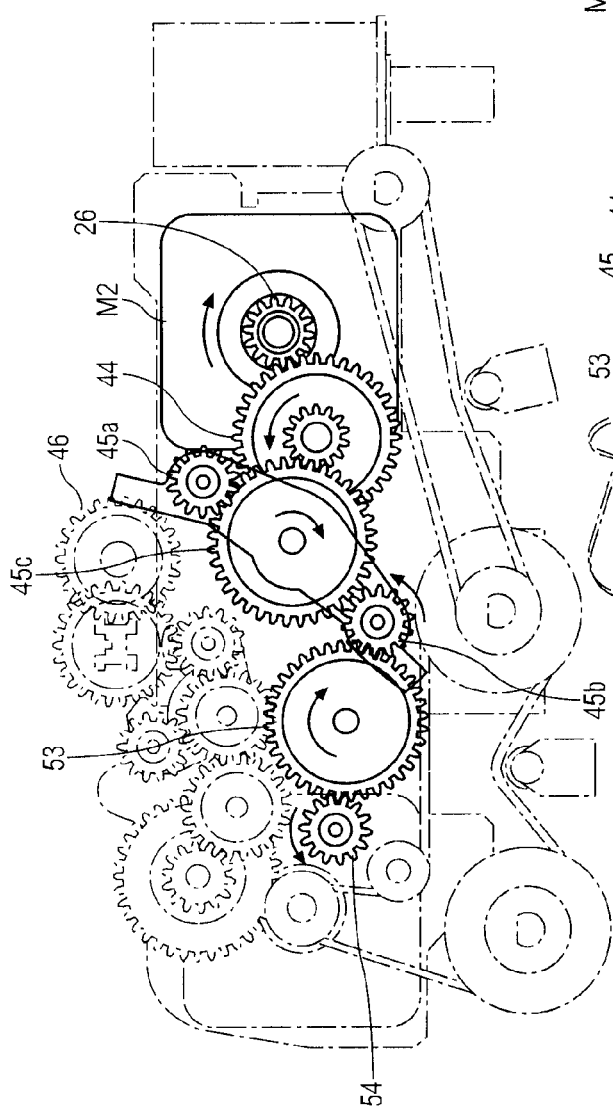
FIG. 12 shows the components in the drive system that are involved in driving the de-skew rollers of the automatic document feeder.

FIG. 12 shows the gears involved in driving the lower de-skew rollers 13b. When the pick motor M2 rotates clockwise, the swing gear set 45 swings into contact with a de-skew gear train composed of a drive gear 53 and a de-skew gear 54 so that lower swing gear 45b meshes with the drive gear 53 (the upper swing gear 45a is now out of contact with the pick gear 46). Consequently, the de-skew gear 54 is driven to rotate counter-clockwise.

Figure 13:
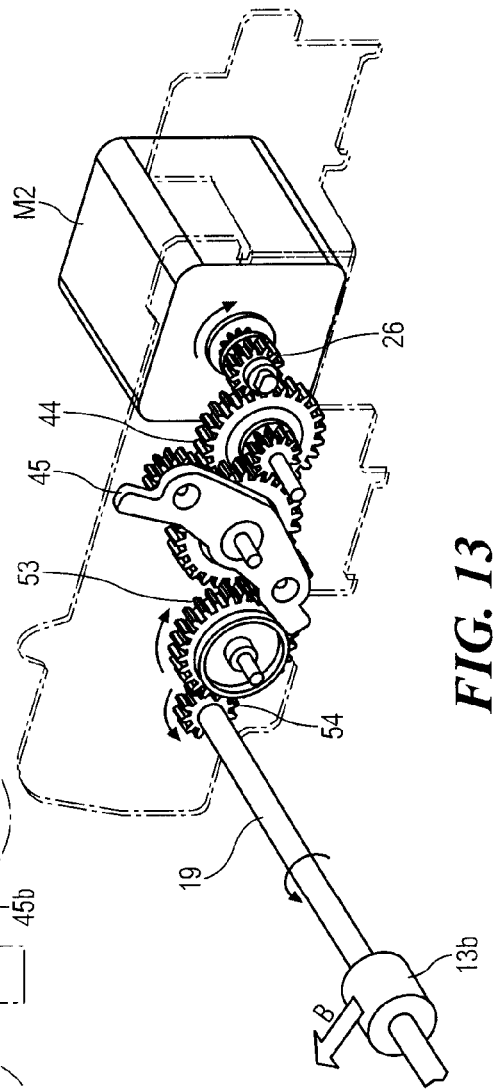
FIG. 13 illustrates the components shown in FIG. 12 are operatively connected to the de-skew rollers.

Referring to FIG. 13, the lower de-skew rollers 13b (only one is shown herein) are driven to rotate via de-skew shaft 19. The de-skew gear 54 is fixedly attached to one end of the de-skew shaft 19 so as to rotate integrally with the de-skew shaft 19. As such, when the pick motor 25 rotates clockwise, the lower de-skew rollers 13b are driven to rotate counter-clockwise via de-skew shaft 19, thereby causing the media sheet to move in the direction indicated by arrow B.

The ADF 1 shown in FIG. 1 is operable to perform single-side scanning or double-side ("duplex") scanning. In the case of single-side scanning, one side of a document is scanned and then the document is discharged onto the output tray. In the case of double-side scanning, a first side of the document is scanned, and then the document is re-introduced into the media path $P_1$ via the switch-back path $P_2$ so that the second side can be scanned. Furthermore, the ADF 1 may be selected by a user to perform single-side scanning in a "Normal Mode," which provides high-speed conveyance of the media sheets (i.e. high throughput) and is suitable for thin media, or a "Delay Mode," which is suitable for thicker or stiffer media. During the "Normal Mode," the pickup unit 12 begins picking a subsequent media sheet from the media stack as soon as the previously picked media sheet has passed the pick roller 12a of the pickup unit 12. During the "Delay Mode," the pickup unit 12 delays the picking of the subsequent media sheet until after the previous media sheet has passed the de-skew rollers 13.

Figure 14A:
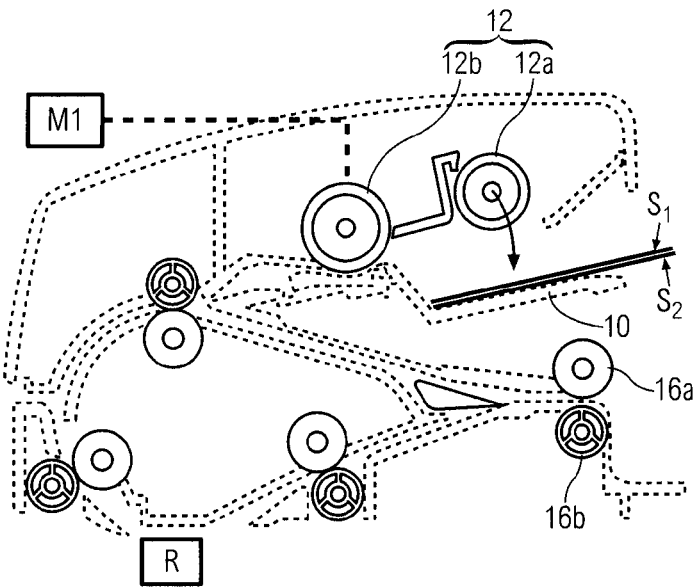
FIGS. 14A-14H are sequential schematic diagrams illustrating the manner of document conveyance when the automatic document feeder is operating in single-side "Normal Mode."
Figure 14B:
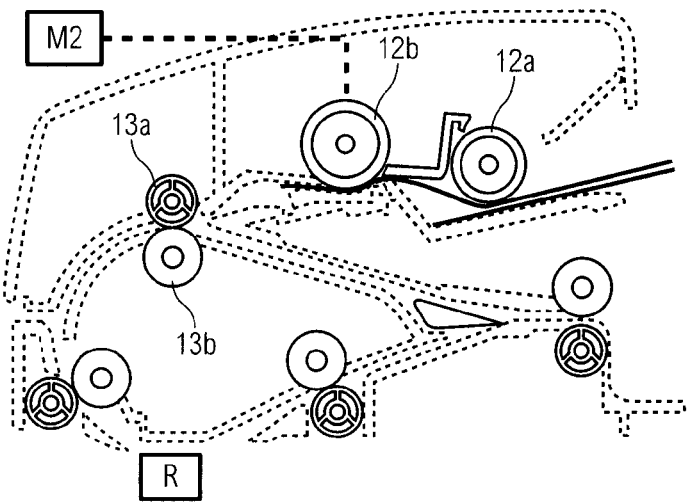
Figure 14C:
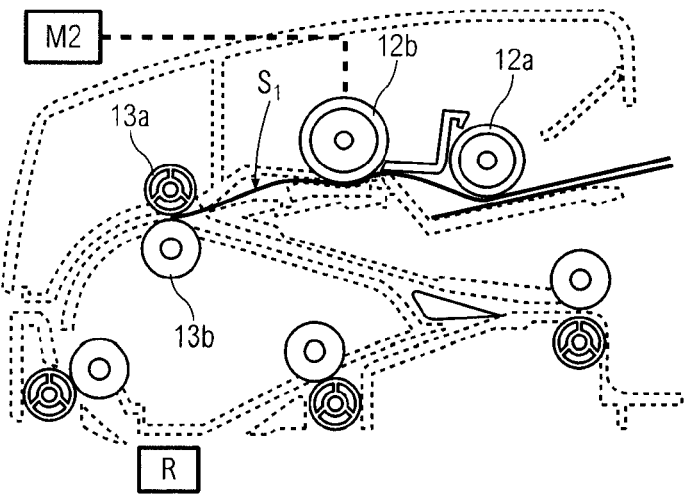
Figure 14D:
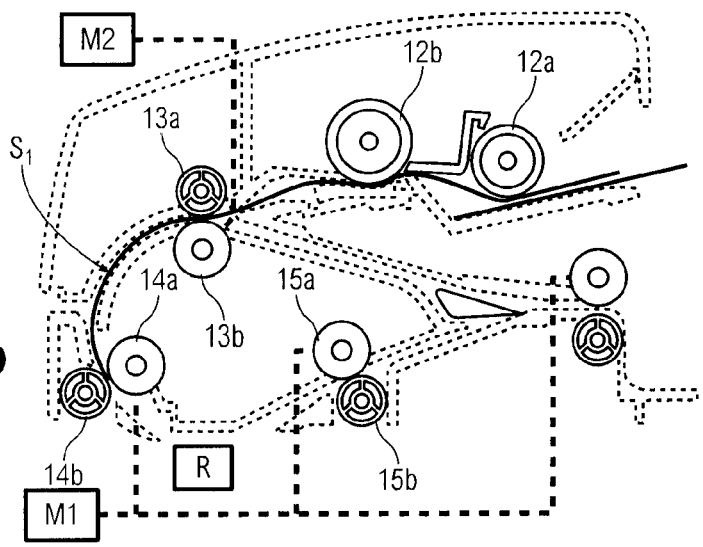
Figure 14E:
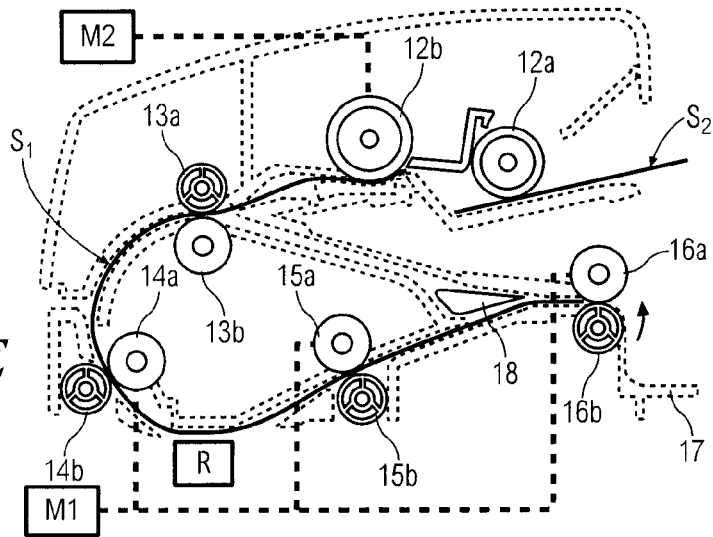
Figure 14F:
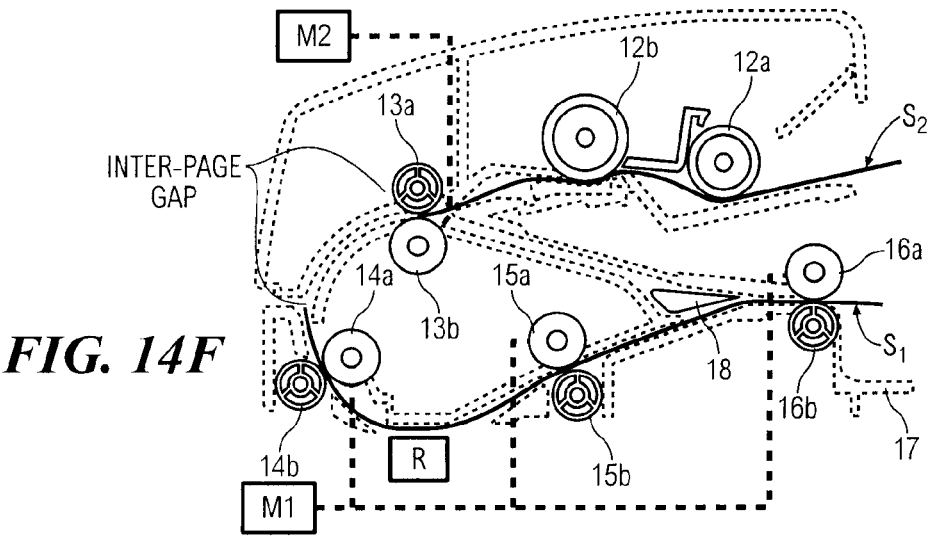
Figure 14G:
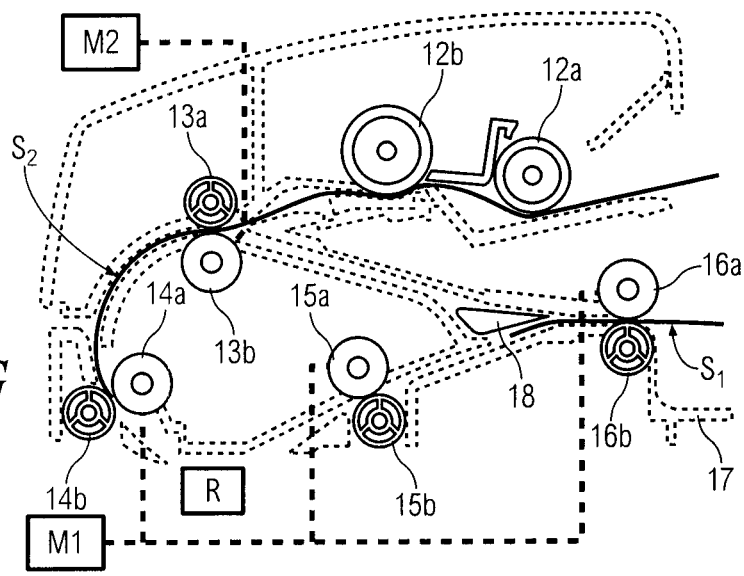
Figure 14H:
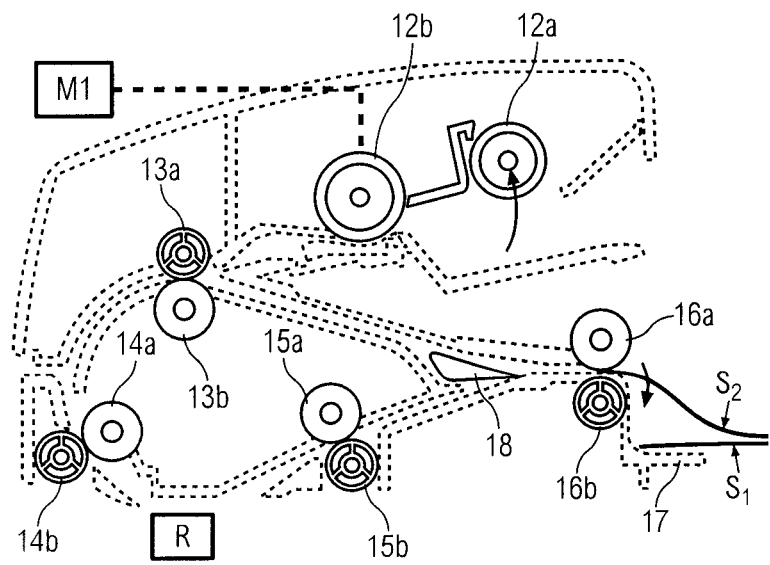

The manner of document conveyance when the ADF 1 is operating in the single-side "Normal Mode" will now be described with reference to FIGS. 14A-14H. Referring to FIG. 14A, only two sheets ($S_1$, $S_2$) are to be scanned. These sheets are placed on the supply tray 10 so that the image data to be scanned is facing up. First, the pickup unit 12 is pivoted downward by the driving force of the media motor M1 (FIG. 14A), thereby causing the pick roller 12a to be in contact with the uppermost sheet $S_1$. Initially, the lower output rollers 16b are out of nipping contact with the upper output rollers 16a. Next, the pickup unit 12 is driven by the pick motor M2 rotating in one direction so as to cause the pick roller 12a to pull sheet $S_1$ toward the feed roller 12b, which in turn advances sheet $S_1$ toward the de-skew rollers 13a and 13b (FIG. 14B). When the leading edge of sheet $S_1$ reaches the de-skew rollers (13a, 13b), which are not rotating at this time, the leading edge abuts against the nip formed between the upper and lower de-skew rollers (13a, 13b) to form a "buckle" or bend, which allows the leading edge to square up at the nip, thereby eliminating skew (FIG. 14C). Thereafter, the pick motor M2 rotates in the opposite direction in order to cause the de-skew rollers (13a, 13b) to advance sheet $S_1$ further downstream toward the pre-scan rollers 14a and 14b (FIG. 14D). Subsequently, the pre-scan rollers (14a, 14b), the post-scan rollers (15a, 15b), and the output rollers (16a, 16b) are driven by the media motor M1 to move sheet $S_1$ past the image reader R and then toward the output tray 17 (FIG. 14E). The switching lever 18 is lifted by the leading edge of sheet $S_1$ in order to allow sheet $S_1$ to advance toward the output rollers (16a, 16b). Up until this point, the lower output rollers 16b have been out of contact with the upper output rollers 16a. However, when the leading edge of sheet $S_1$ is between the output rollers (16a, 16b), the solenoid 26 is activated to move the lower output rollers 16b into nipping contact with the upper output rollers 16a, causing sheet $S_1$ to be nipped between the output rollers. As soon as the trailing edge of sheet $S_1$ passes the pick roller 12a, the pick roller 12a is driven by the pick motor M2 to pull the subsequent media sheet $S_2$ from the input tray 10 (FIG. 14E). The pre-scan and post-scan rollers (14a, 14b, 15a, 15b) must move sheet $S_1$ beyond the de-skew rollers (13a, 13b) when the picking of the subsequent sheet $S_2$ begins because the de-skew rollers are no longer driven to advance sheet $S_1$ downstream at such time. Subsequently, sheet $S_2$ goes through skew correction at the de-skew rollers (13a, 13b) as described for sheet $S_1$ while sheet $S_1$ is being advanced further downstream (FIG. 14F). As a result of this picking sequence, a relatively small inter-page gap is maintained between sheet $S_1$ and sheet $S_2$, as depicted by FIG. 14F, and high-speed conveyance is obtained. Referring to FIG. 14G, the output rollers (16a, 16b) continue to advance sheet $S_1$ toward the output tray 17, while the de-skew rollers (13a, 13b) move sheet $S_2$ toward the pre-scan rollers (14a, 14b). After sheet $S_2$ (i.e. the last sheet) is scanned, it is discharged to the output tray 17 (FIG. 14H). At this time, the lower output rollers 16b move out of contact with the upper output rollers 16a (by inactivating the solenoid 26), and the pick roller 12a is driven by the media motor M1 to move upward to the stowed position (FIG. 14H). At the output tray 17, the sheets are successively discharged and stacked with the image data facing down.

Figure 15A:
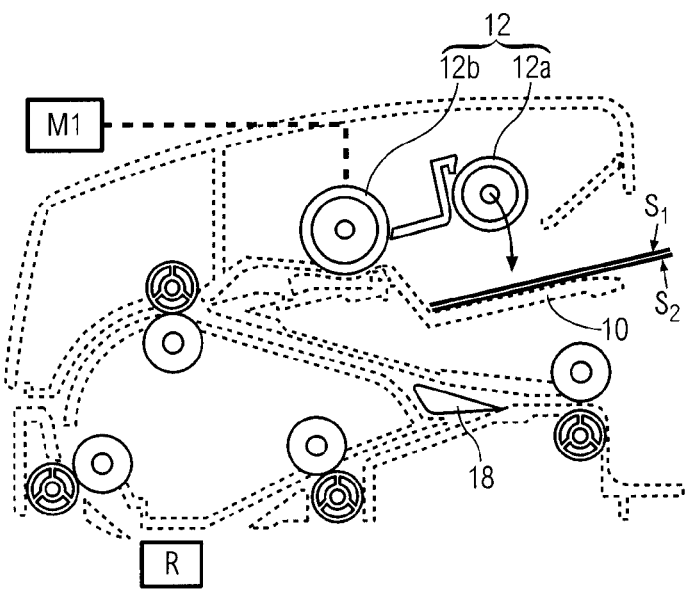
FIGS. 15A-15H are sequential schematic diagrams illustrating the manner of document conveyance when the automatic document feeder is operating in single-side "Delay Mode."
Figure 15B:
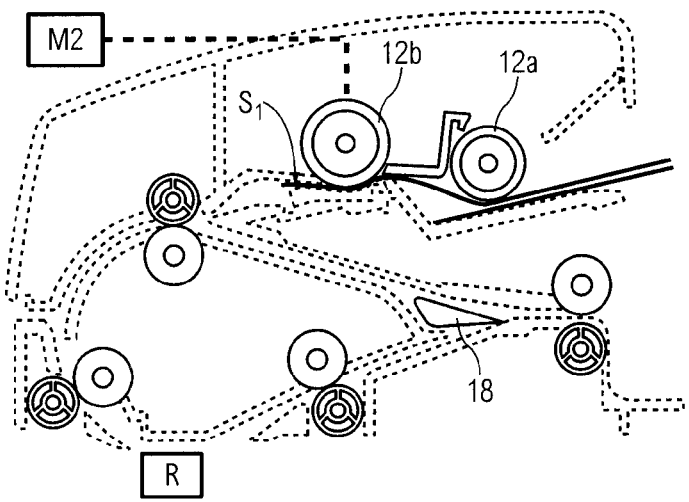
Figure 15C:
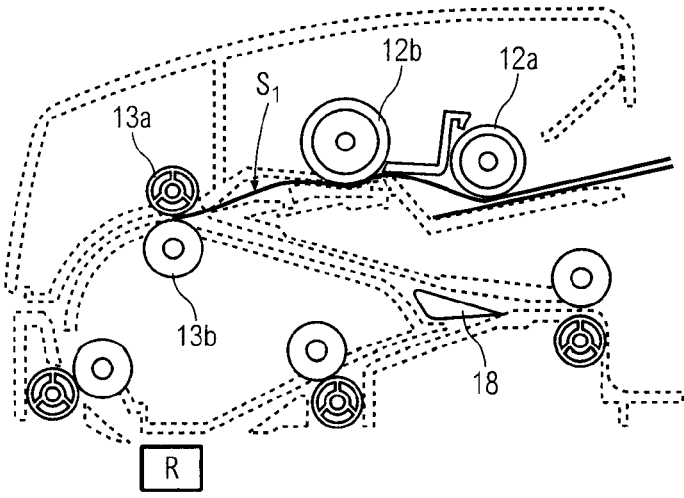
Figure 15D:
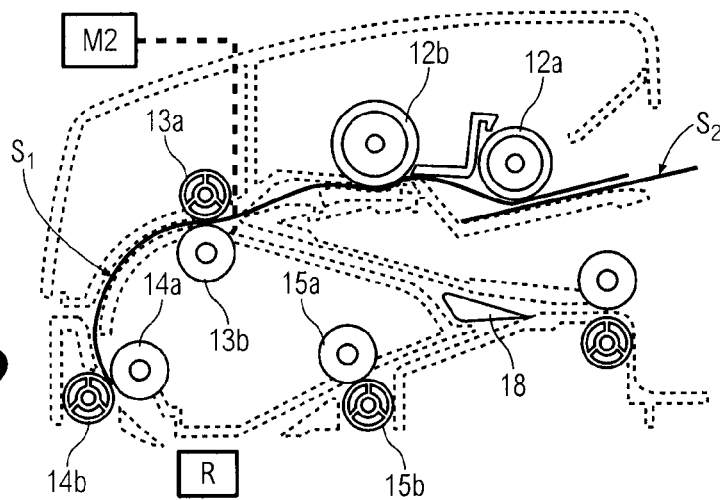
Figure 15E:
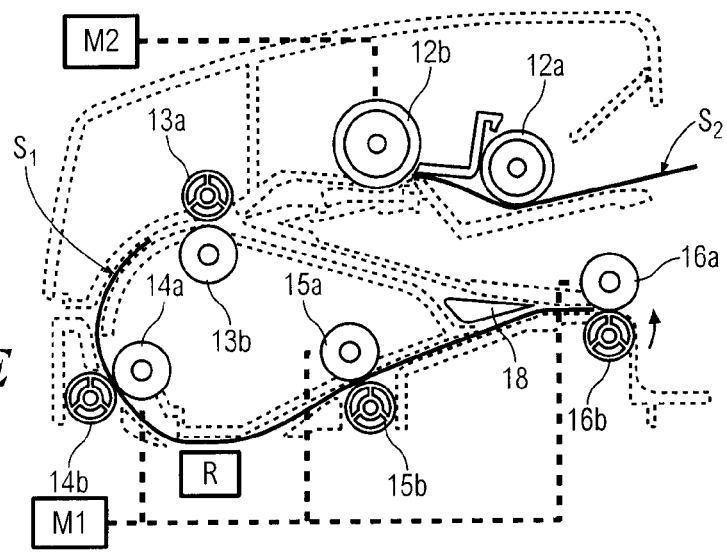
Figure 15F:
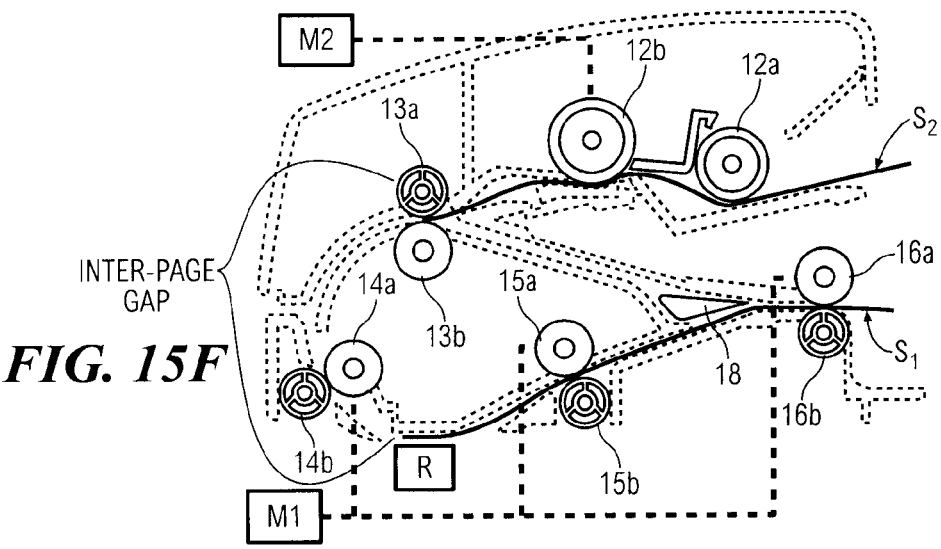
Figure 15G:
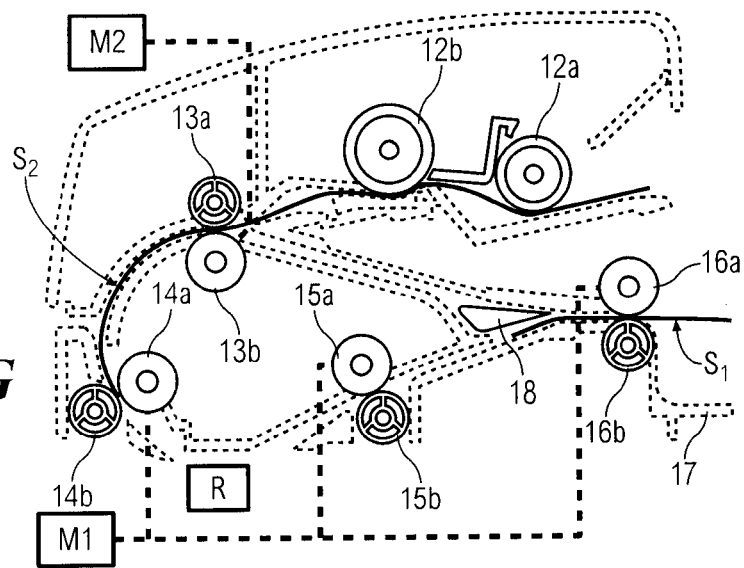
Figure 15H:
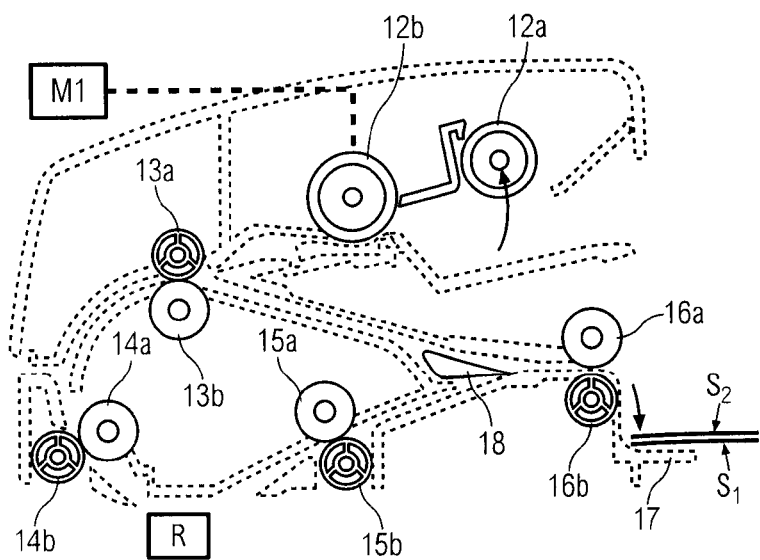

The manner of document conveyance when the ADF 1 is operating in the single-side "Delay Mode" will now be described with reference to FIGS. 15A-15H. Referring to FIGS. 15A-15C, the uppermost sheet $S_1$ is pulled from the supply tray 10 and goes through skew correction at the de-skew rollers (13a, 13b) as described previously with reference to FIGS. 14A-14C. Thereafter, the de-skew rollers (13a, 13b) are driven by the pick motor M2 to advance sheet $S_1$ further downstream toward the pre-scan rollers 14a and 14b (FIG. 15D). Referring to FIG. 15E, as soon as the trailing edge of sheet $S_1$ passes the de-skew rollers (13a, 13b), the pick roller 12a is driven by the pick motor M2 to pull the subsequent sheet $S_2$ from the supply tray 10. Then, sheet $S_2$ goes through skew correction at the de-skew rollers (13a, 13b) while sheet $S_1$ is being advanced further downstream (FIG. 15F). As a result of this delayed picking sequence, a relatively large inter-page gap is maintained between sheet $S_1$ and sheet $S_2$, as depicted by FIG. 15F. Subsequently, the de-skew rollers (13a, 13b) and the pre-scan rollers (14a, 14b) advance sheet $S_2$ further downstream while sheet $S_1$ is being advanced toward the output tray 17 (FIG. 15G). After sheet $S_2$ is discharged to the output tray 17, the lower output rollers 16b move out of contact with the upper output rollers 16a, and the pick roller 12a is driven by the media motor M1 to move upward to the stowed position (FIG. 15H). The "Delay Mode" is very effective for conveying thicker or stiffer media, e.g. photographic papers, through the U-shaped media path $P_1$ of the ADF 1. This is because the traction provided by the pre-scan rollers (14a, 14b) and post-scan rollers (15a, 15b) may be insufficient to overcome the additional drag on the thicker or stiffer media sheet, and inaccurate media advancement may result. It has been found that traction can be increased by using the de-skew rollers (13a, 13b) to assist in moving the media sheet downstream and delaying the initiation of picking the subsequent media sheet until the trailing edge of the previous media sheet passes the de-skew rollers.

Figure 16A:
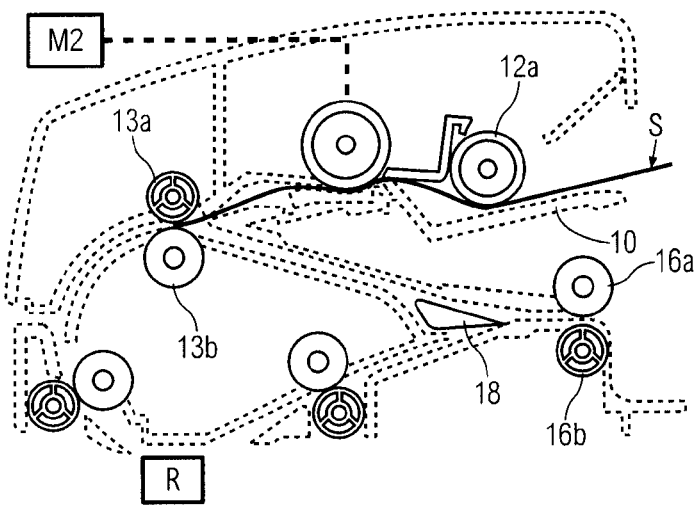
FIGS. 16A-16J are sequential schematic diagrams illustrating document conveyance when the automatic document feeder is operating in double-side "Duplex Mode."
Figure 16B:
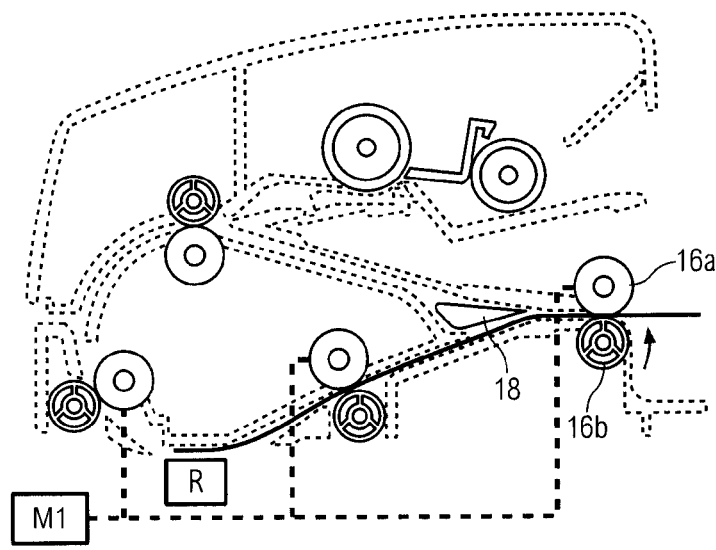
Figure 16C:
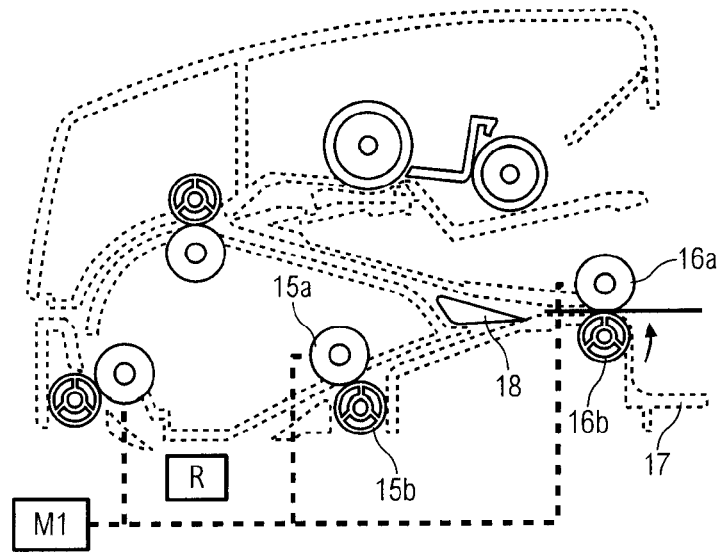
Figure 16D:
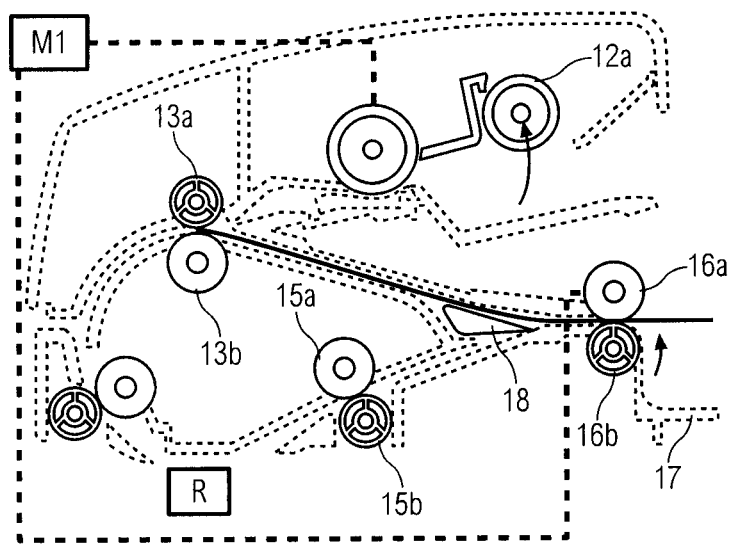
Figure 16E:
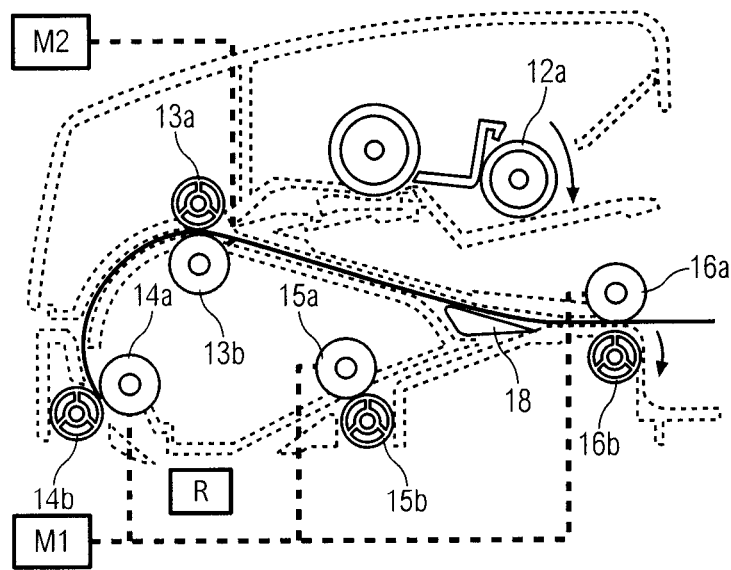
Figure 16F:
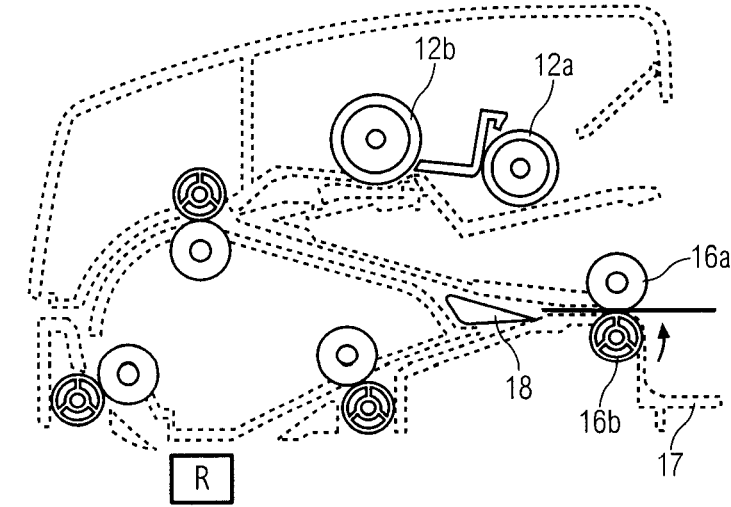
Figure 16G:
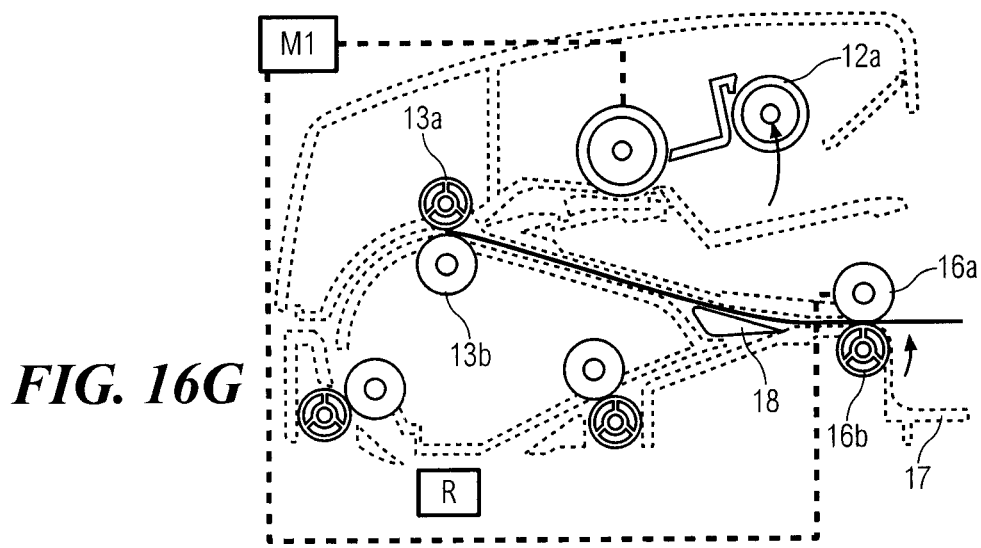
Figure 16H:
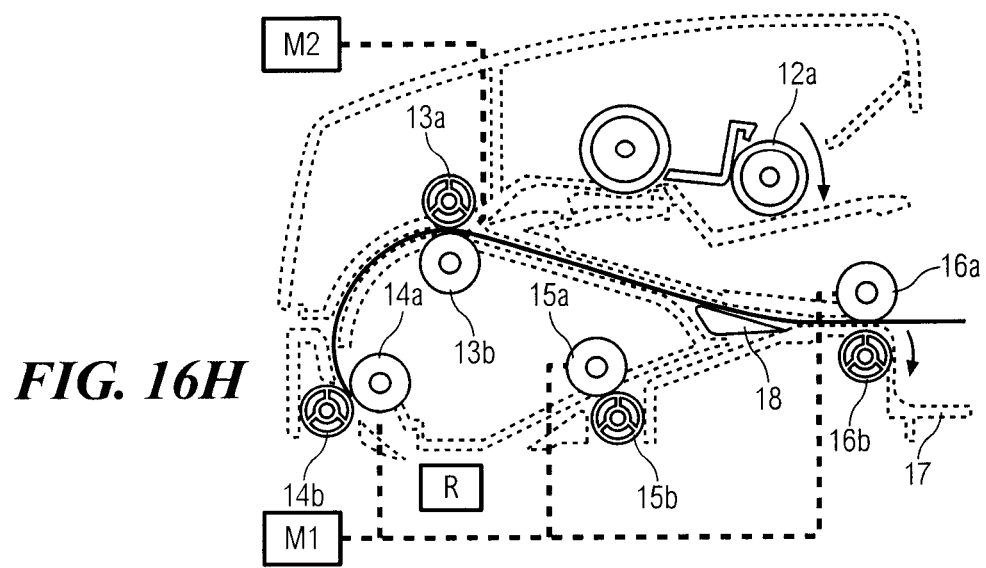
Figure 16I:
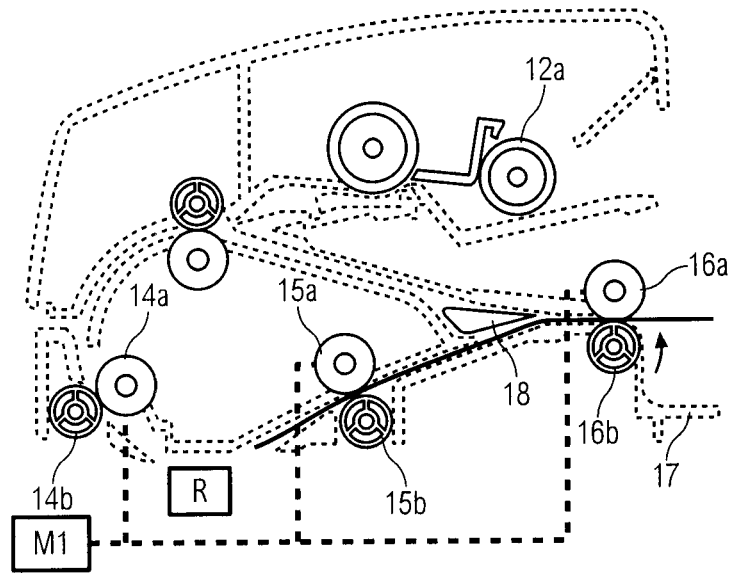
Figure 16J:
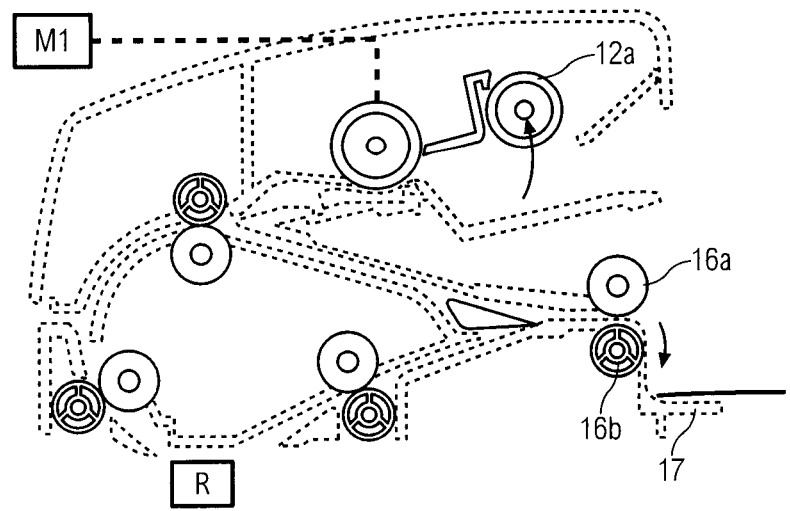

The manner of document conveyance when the ADF 1 is operating in the double-side scanning mode ("Duplex Mode") will now be described with reference to FIGS. 16A-16J. When the "Duplex Mode" is selected by the user, the sheet S is picked from the supply tray 10 and goes through skew correction at the de-skew rollers (13a, 13b) (FIG. 16A). Initially, the lower output rollers 16b are out of nipping contact with the upper output rollers 16a. The sheet S is then transported past the image reader R so that the first side of the sheet is scanned (FIG. 16B). The lower output rollers 16b move into nipping contact with the upper output rollers 16a when the leading edge of sheet S is between the upper and lower output rollers. After scanning of the first side is finished, sheet S is advanced toward the output tray 17 until the trailing edge has passed the switching lever 18 but is still nipped by the output rollers (16a, 16b) as shown in FIG. 16C. At this time, the switching lever 18 is in a position that blocks the sheet passage from the post-scan rollers (15a, 15b) to the output tray 17, but opens up the switch-back path $P_2$. Next, the media motor M1 rotates in the reverse direction to reverse the rotation of the output rollers (16a, 16b) so that sheet S is guided into the switch-back path $P_2$ (FIG. 16D). The reverse rotation of the media motor M1 also causes the pick roller 12a to move upward (FIG. 16D). When sheet S reaches the de-skew rollers (13a, 13b), sheet S goes through skew correction as before. After skew correction, the de-skew rollers (13a, 13b) are driven by the pick motor M2 to advance sheet S toward the pre-scan rollers (14a, 14b) (FIG. 16E). The lower output rollers 16b move out of nipping contact with the upper output rollers 16a while sheet S is being advanced by the de-skew rollers (13a, 13b). At this time, the media motor M1 again reverse its rotation so that the pre-scan rollers (14a, 14b), the post-scan rollers (15a, 15b), and the output rollers (16a, 16b) can advance sheet S toward the output tray 17, resulting in the pick roller 12a being lowered (FIG. 16E). Subsequently, sheet S is transported past the image reader R so that the second side of sheet S is scanned, and is advanced further downstream toward the output tray 17 until the trailing edge has passed the switching lever 18 but is still nipped by the upper and lower output rollers (16a, 16b) as shown in FIG. 16F. During this time, the lower output rollers 16b move into nipping contact with the upper output rollers 16a when sheet S again reaches output rollers (16a, 16b). Next, sheet S is again conveyed back to the switch-back path $P_2$ (FIG. 16G) and re-introduced into main media path $P_1$ for the third time (FIG. 16H). However, during the third passage of sheet S through path $P_1$, scanning is not performed. At the end of the third passage, sheet S is nipped by the output rollers (16a, 16b) and advanced toward the output tray 17 (FIG. 16I). Afterwards, sheet S is discharged to the output tray 17 with the first side facing downward, the pick roller 12a moves upward to the stowed position, and the lower output rollers 16b move out of nipping contact with the upper output rollers 16a (FIG. 16J). In the case of processing a stack of sheets in the "Duplex Mode," the picking of a subsequent sheet is initiated during the third passage of the previous sheet through the main media path $P_1$, but after the trailing edge of previous sheet has passed the de-skew rollers (13a, 13b). In this way, the sheets are conveyed sequentially through the ADF 1 for double-side scanning and discharged onto the output tray 17 in the same page order as the initial stack except that the first sheet is at the lowest position in the output tray 17.

The ADF 1 as describe above may be incorporated in conventional image forming apparatuses such as copiers, facsimile machines, stand-alone scanning machines, and multi-function printers. For example, the ADF 1 may be arranged over an image forming apparatus with a horizontal glass platen such that the image reader R is positioned at one end the platen. One advantage provided by the ADF 1 is that it has a drive transmission assembly that is capable of providing a higher traction and an improved image quality for stiffer and thicker media. In addition, the ADF 1 can be implemented at a lower cost than other automatic document feeders with automatic skew correction and duplex scanning functions because the drive system of the ADF 1 does not require more than two motors or complicated driving mechanisms.

While particular embodiments of the present invention have been described, it will be understood by those skilled in the art that modifications and substitutions can be made without departing from the scope of the invention as set forth in the following claims.

We claim:

1. A sheet feeding apparatus, comprising:
   a supply tray for holding media sheets;
   an output tray;
   a pickup unit configured to pull a media sheet from the supply tray and feed the media sheet to a scanning region in a media path;
   opposing de-skew rollers positioned at a beginning of the media path and configured to de-skew the media sheet when the media sheet enters the media path;
   opposing pre-scan rollers positioned along said media path upstream from the scanning region;
   opposing post-scan rollers positioned along said media path downstream from the scanning region;
   opposing output rollers positioned at an end of the media path; and
   a switch-back path extending from the output rollers to the de-skew rollers and configured to guide the media sheet back into the media path,
   wherein the pickup unit, the de-skew rollers, the pre-scan rollers, the post-scan rollers, and the output rollers cooperate to provide, separately, a high throughput mode, a delay mode, and a duplex mode of the sheet feeding apparatus,
   wherein, in the high throughput mode, the pre-scan rollers contact a trailing end of a previous media sheet as the de-skew rollers contact a leading end of a subsequent media sheet.

2. The sheet feeding apparatus of claim 1, wherein the pickup unit comprises a pick roller configured to pull the media sheet from the supply tray and a feed roller configured to feed the media sheet into the media path.

3. The sheet feeding apparatus of claim 2,
   wherein, in the high throughput mode, a subsequent media sheet is pulled from the supply tray as soon as a trailing edge of a previous media sheet passes the pick roller,
   wherein, in the delay mode, a subsequent media sheet is pulled from the supply tray as soon as a trailing edge of a previous media sheet passes the de-skew rollers, and
   wherein, in the duplex mode, the output rollers are reversed to guide the media sheet into the switch-back path.

4. The sheet feeding apparatus of claim 2, further comprising:
   a drive system including a media motor and a pick motor,
   wherein, in the high throughput mode, the pickup unit is driven by the pick motor to pull a subsequent media sheet from the supply tray as soon as a trailing edge of a previous media sheet passes the pick roller,
   wherein, in the delay mode, the de-skew rollers are driven by the pick motor to advance a previous media sheet in the media path and the pickup unit is driven by the pick motor to pull a subsequent media sheet from the supply tray as soon as a trailing edge of the previous media sheet passes the de-skew rollers, and
   wherein, in the duplex mode, the output rollers are driven by the media motor to guide the media sheet into the switch-back path.

5. The sheet feeding apparatus of claim 1, wherein the media path is configured to guide the media sheet from the pickup unit to the scanning region and from the scanning region to the output tray.

6. The sheet feeding apparatus of claim 1, wherein the media path is a U-shaped media path.

7. The sheet feeding apparatus of claim 1, further comprising:
   a switching lever positioned at a junction between the media path and the switch-back path to guide a direction of the media sheet.

8. The sheet feeding apparatus of claim 1, wherein, in the delay mode, a trailing end of a previous media sheet is downstream the pre-scan rollers as the de-skew rollers contact a leading end of a subsequent media sheet.

9. A sheet feeding apparatus, comprising:
   a supply tray for holding media sheets;
   an output tray;
   a pickup unit having a pick roller for pulling a media sheet from the supply tray and a feed roller for feeding the media sheet into a media path;
   opposing de-skew rollers positioned at a beginning of the media path and configured to de-skew the media sheet when the media sheet enters the media path;
   opposing output rollers positioned at an end of the media path;
   a switch-back path extending from the output rollers to the de-skew rollers and configured to guide the media sheet back into the media path; and
   a drive system operable to provide, separately, a high throughput mode, a delay mode, and a duplex mode of the sheet feeding apparatus,
   wherein, in the high throughput mode, a subsequent media sheet is pulled from the supply tray as soon as a trailing edge of a previous media sheet passes the pick roller,
   wherein, in the delay mode, a subsequent media sheet is pulled from the supply tray as soon as a trailing edge of a previous media sheet passes the de-skew rollers, and
   wherein, in the duplex mode, the output rollers are reversed to guide the media sheet into the switch-back path.

10. The sheet feeding apparatus of claim 9, wherein the drive system includes a media motor and a pick motor, and
    wherein, in the high throughput mode, the pickup unit is driven by the pick motor to pull the subsequent media sheet from the supply tray as soon as the trailing edge of the previous media sheet passes the pick roller,
    wherein, in the delay mode, the de-skew rollers are driven by the pick motor to advance the previous media sheet in the media path and the pickup unit is driven by the pick motor to pull the subsequent media sheet from the supply tray as soon as the trailing edge of the previous media sheet passes the de-skew rollers, and wherein, in the duplex mode, the output rollers are driven by the media motor to guide the media sheet into the switch-back path.

11. The sheet feeding apparatus of claim 9, wherein the media path is a U-shaped media path.

12. The sheet feeding apparatus of claim 9, wherein the media path is configured to guide the media sheet from the pickup unit to a scanning region and from the scanning region to the output tray, and further comprising:
   opposing pre-scan rollers positioned along the media path upstream from the scanning region; and
   opposing post-scan rollers positioned along the media path downstream from the scanning region.

13. The sheet feeding apparatus of claim 12, wherein, in the high throughput mode, the pre-scan rollers and the post-scan rollers move the previous media sheet through the media path beyond the de-skew rollers as the subsequent media sheet is pulled from the supply tray.

14. The sheet feeding apparatus of claim 12, wherein, in the high throughput mode, the output rollers advance the previous media sheet toward the output tray while the de-skew rollers move the subsequent media sheet toward the pre-scan rollers.

15. The sheet feeding apparatus of claim 12, wherein, in the delay mode, the de-skew rollers and the pre-scan rollers advance the subsequent media sheet while the previous media sheet is advanced toward the output tray.

16. The sheet feeding apparatus of claim 12, wherein, in the delay mode, the de-skew rollers, the pre-scan rollers, and the post-scan rollers together move the previous media sheet through the media path until the trailing edge of the previous media sheet passes the de-skew rollers.

17. The sheet feeding apparatus of claim 12, further comprising:
   a switching lever positioned at a junction between the media path and the switch-back path to guide a direction of the media sheet.

18. The sheet feeding apparatus of claim 17, wherein, in the duplex mode, after the trailing edge of the media sheet passes the switching lever, the switching lever blocks the media path from the post-scan rollers to the output tray and opens the switch-back path from the output rollers to the de-skew rollers.

19. The sheet feeding apparatus of claim 12, wherein, in the high throughput mode, the pre-scan rollers contact a trailing end of a previous media sheet as the de-skew rollers contact a leading end of a subsequent media sheet.

20. The sheet feeding apparatus of claim 19, wherein, in the delay mode, a trailing end of a previous media sheet is downstream the pre-scan rollers as the de-skew rollers contact a leading end of a subsequent media sheet.

\* \* \* \* \*